United States Patent
Wada et al.

(10) Patent No.: US 7,910,242 B2
(45) Date of Patent: Mar. 22, 2011

(54) NONAQUEOUS ELECTROLYTE SECONDARY BATTERY

(75) Inventors: Naoyuki Wada, Osaka (JP); Hideaki Fujita, Osaka (JP); Yukihiro Okada, Osaka (JP); Yoshiyuki Muraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 12/034,460

(22) Filed: Feb. 20, 2008

(65) Prior Publication Data

US 2008/0199768 A1    Aug. 21, 2008

(30) Foreign Application Priority Data

Feb. 20, 2007   (JP) .................. 2007-039354

(51) Int. Cl.
    *H01M 2/00*   (2006.01)
(52) U.S. Cl. ........ 429/163; 429/162; 429/164; 429/168; 429/176
(58) Field of Classification Search .................. 429/127, 429/162, 163, 164, 176, 168
    See application file for complete search history.

(56) References Cited

U.S. PATENT DOCUMENTS

| 6,413,679 | B1 * | 7/2002 | Kuboki et al. ................ 429/347 |
| 6,623,888 | B1 * | 9/2003 | Omaru et al. ............... 429/231.8 |
| 6,841,297 | B2 * | 1/2005 | Kitoh et al. .................... 429/176 |
| 2003/0175583 | A1 * | 9/2003 | Suzuki ........................... 429/57 |

FOREIGN PATENT DOCUMENTS

JP          10-321260           12/1998

* cited by examiner

*Primary Examiner* — Jane Rhee
(74) *Attorney, Agent, or Firm* — McDermott Will & Emery LLP

(57) ABSTRACT

In a nonaqueous electrolyte secondary battery in which an electrode plate group including a positive electrode plate and a negative electrode plate which have a positive electrode mixture layer formed on a positive electrode current collector to contain a positive electrode active material and a negative electrode mixture layer formed on a negative electrode current collector to contain a negative electrode active material, respectively, and are spirally wound or stacked with a separator interposed therebetween is encapsulated in a battery exterior packaging body with an electrolyte, the battery exterior packaging body includes a gas releasing valve for releasing gas in the battery exterior packaging body to the outside when a gas pressure in the battery exterior packaging body reaches a working pressure and is formed to be deformable where the gas pressure in the battery exterior packaging body is lower than the working pressure of the gas releasing valve.

11 Claims, 4 Drawing Sheets

NONAQUEOUS ELECTROLYTE SECONDARY BATTERY

CROSS-REFERENCE TO RELATED APPLICATION

The disclosure of Japanese Patent Application No. 2007-39354 filed on Feb. 20, 2007, including specification, drawings and claims is incorporated herein by reference in its entirety.

BACKGROUND OF THE INVENTION

The present invention relates to a nonaqueous electrolyte secondary battery such as a lithium ion secondary battery, and relates to a technique for preventing the battery from overheating.

Nonaqueous electrolyte secondary batteries (mainly lithium ion secondary battery) are high voltage batteries with high energy density. Therefore, the nonaqueous electrolyte secondary batteries have been used as main power supply of mobile equipment such as mobile telecommunication equipment, mobile electronic equipment and the like. Furthermore, in recent years, in consideration of environmental problems, high power lithium ion secondary batteries which can be formed to be smaller and lighter than known batteries are used as automobile use batteries or backup power supply batteries.

However, overheating of such lithium ion secondary batteries might be possibly caused by electrical factors such as overcharge, environmental factors such as high temperature exposure, and mechanical factors such as damages caused by fall of a heavy load, and the like. As a method for testing whether overheating of a battery is caused by mechanical factors, there is a method in which, assuming a most severe situation besides dropping a heavy load onto the battery and adding vibration to the battery, an internal short-circuit is generated by sticking a nail (φ4.8) in a charged lithium ion secondary battery (under the assumption that an abuse stated in the SBA standard, in which a nail or the like is mistakenly stuck in a battery when the battery is packaged in wooden case). Tests conducted in the above-described severe situations showed the result that excessive heat of a lithium ion secondary battery is possibly caused in such situations.

Possible causes for this are as follows. First, due to an internal short-circuit, a large current flows and overheating of short-circuited part occurs. Because of the overheating, a separator is fused. Then, a positive electrode plate and a negative electrode plate are brought into full surface contact with one another by the fusion of the separator. Accordingly, a large internal short-circuit occurs, resulting in excessive heat of the battery.

To prevent the generation of a larger internal short-circuit, there has been a proposed structure in which a gap between an inner surface of a battery case and an outer surface of an electrode plate group is formed substantially in a whole area (for example, see Japanese Laid-Open Publication No. 10-321260). According to the proposal, because of the gap between the inner surface of the battery case and the outer surface of the electrode plate group, full surface contact of a positive electrode plate and a negative electrode plate can be avoided, and thus the generation of a larger internal short-circuit can be prevented.

However, a battery described in Japanese Laid-Open Publication No. 10-321260 has a structure in which a gap is formed inside of the battery and thus a volume of an electrode plate group is reduced. Accordingly, a capacity per volume of the battery is reduced.

SUMMARY OF THE INVENTION

In view of the above-described problems, it is an object of the present invention to provide a nonaqueous electrolyte secondary battery which can maintain high level safety, without reducing a capacity per volume of the battery, when an internal short-circuit occurs due to external impacts such as sticking of a nail therein or crush caused by application of pressure or when a short-circuit occurs due to mixture of a foreign substance or the like.

To achieve the above-described object, an aspect of the present invention is directed to a nonaqueous electrolyte secondary battery in which an electrode plate group including a positive electrode plate and a negative electrode plate which have a positive electrode mixture layer formed on a positive electrode current collector to contain a positive electrode active material and a negative electrode mixture layer formed on a negative electrode current collector to contain a negative electrode active material, respectively, and are spirally wound or stacked with a separator interposed therebetween is encapsulated in a battery exterior packaging body with an electrolyte, and is characterized in that the battery exterior packaging body includes a gas releasing valve for releasing gas in the battery exterior packaging body to the outside when a gas pressure in the battery exterior packaging body reaches a working pressure of the gas releasing valve, and the battery exterior packaging body is formed to be deformable where the gas pressure in the battery exterior packaging body is lower than the working pressure of the gas releasing valve.

In the nonaqueous electrolyte secondary battery of the aspect of the present invention, even in the case where an internal short-circuit occurs in the battery, before the gas releasing valve starts its operation and gas (which is mainly gas generated from the electrolyte when the temperature in the battery is increased due to a short-circuit) filled in the battery exterior packaging body is released to the outside (i.e., the battery is excessively heated), the battery exterior packaging body can be deformed in the direction of application of gas by the gas pressure in the battery exterior packaging body, so that a space can be provided between the inner surface of the battery exterior packing body and the outer surface of the electrode plate group.

Thus, the positive and negative electrode plates can be pressed in the direction of application of gas by the gas pressure in the battery exterior packaging body (for example, when a short-circuit occurs in the battery because a nail is stuck, the positive and negative electrode plates which have been pressed in the direction of sticking of the nail are pressed against in the opposite direction to the direction of sticking of the nail, in other words, the direction of application of gas), so that an inter-electrode-plate-space between the positive electrode plate and the negative electrode plate can be increased. Therefore, a continuous short-circuit due to surface contact of the positive electrode plate and the negative electrode plate can be suppressed and a highly safe nonaqueous electrolyte secondary battery can be realized.

According to another aspect of the present invention, in the nonaqueous electrolyte secondary battery, it is preferable that in a temperature range which is higher than a boiling point of the electrolyte and is lower than a decomposition temperature of the positive electrode active material, the battery exterior packaging body is formed to be deformable when the gas pressure in the battery exterior packaging body is lower than the working pressure of the gas releasing valve.

Thus, by the gas pressure of gas generated from the electrolyte at a time of increase in temperature in the battery due to a short-circuit, the battery exterior packaging body can be deformed in the direction of application of the gas before the temperature in the battery reaches the decomposition temperature of the positive electrode active material (i.e., the battery is excessively heated).

According to still another aspect of the present invention, in the nonaqueous electrolyte secondary battery, it is preferable that the battery exterior packaging body has a cylindrical shape.

According to still another aspect of the present invention, in the nonaqueous electrolyte secondary battery, it is preferable that a tensile strength of the battery exterior packaging body is smaller than PR/t where the working pressure of the gas releasing valve is P, an inner diameter of the battery exterior packaging body is R and a thickness of the battery exterior packaging body is t.

According to still another aspect of the present invention, in the nonaqueous electrolyte secondary battery, it is preferable that the battery exterior packaging body is formed of aluminum or aluminum alloy.

According to still another aspect of the present invention, in the nonaqueous electrolyte secondary battery, it is preferable that the positive electrode active material contains at least one of manganese composite oxide, nickel composite oxide and cobalt composite oxide.

Thus, a battery containing as a positive electrode active material, for example, manganese composite oxide, nickel composite oxide, cobalt composite oxide or the like has a higher battery voltage and, in the battery, when a short-circuit occurs, an electrolyte is easily decomposed and gas is easily generated from the electrolyte, for example, compared to a battery containing olivinate. Therefore, the present invention can be effectively applied thereto.

According to still another aspect of the present invention, in the nonaqueous electrolyte secondary battery, it is preferable that the electrode plate group contains a gas generating material for generating gas at a lower temperature than a decomposition temperature of the positive electrode active material.

Thus, the battery exterior packaging body can be deformed in the direction of application of gas not only by the gas pressure of gas generated from the electrolyte and filled in the battery exterior packaging body but also by the gas pressure of gas generated from the gas generating material, before the temperature in the battery reaches the decomposition temperature of the positive electrode active material (i.e., the battery is excessively heated).

According to still another aspect of the present invention, in the nonaqueous electrolyte secondary battery, it is preferable that the gas generating material generates gas at a higher temperature than a fusing temperature of the separator.

Thus, the battery exterior packaging body can be deformed in the direction of application of gas not only by the gas pressure of gas generated from the electrolyte but also by the gas pressure of gas generated from the gas generating material within the temperature range which is higher than the fusing temperature of the separator and is lower than the decomposition temperature of the positive electrode active material, before the temperature in the battery reaches the decomposition temperature of the positive electrode active material.

According to still another aspect of the present invention, in the nonaqueous electrolyte secondary battery, it is preferable that the gas generating material generates gas at a higher temperature than a boiling point of the electrolyte.

Thus, the battery exterior packaging body can be deformed in the direction of application of gas not only by the gas pressure of gas generated from the electrolyte but also by the gas pressure of gas generated from the gas generating material within the temperature range which is higher than the boiling point of the electrolyte and is lower than the decomposition temperature of the positive electrode active material, before the temperature in the battery reaches the decomposition temperature of the positive electrode active material and, more preferably, before the temperature in the battery reaches the fusing temperature of the separator.

According to still another aspect of the present invention, in the nonaqueous electrolyte secondary battery, the gas generating material may be any material which generates gas. However, in consideration of reactivity of the positive electrode active material and the negative electrode active material with the nonaqueous electrolyte, the gas generating material is preferably a material which generates carbon dioxide gas as an inert gas. Specifically, inorganic carbonate such as sodium hydrogen carbonate, potassium hydrogen carbonate, lithium carbonate, zinc carbonate, lead carbonate, strontium carbonate or the like, organic acid such as malonic acid, adipic acid, acetoacetic acid, oxalic acid, lithium oxalate or the like, and the like can be used as the gas generating material.

Thus, the gas generating material is thermally decomposed and generates gas in the battery exterior packaging body before the temperature in the battery reaches the decomposition temperature of the positive electrode active material.

As has been described, in the nonaqueous electrolyte secondary battery of any one of the aspects of the present invention, even in the case where an internal short-circuit occurs, before the gas releasing valve starts its operation and gas (which is mainly gas is generated from the electrolyte when the temperature in the battery is increased due to the short-circuit) filled in the battery exterior packaging body is released to the outside (i.e., the battery is excessively heated), the battery exterior packaging body can be deformed in the direction of application of gas by the gas pressure in the battery exterior packaging body, so that a space can be provided between the inner surface of the battery exterior packaging body and the outer surface of the electrode plate group.

Thus, the positive and negative electrode plates can be pressed in the direction of application of gas by the gas pressure in the battery exterior packaging body, so that an inter-electrode-plate-space between the positive electrode plate and the negative electrode plate can be increased. Accordingly, before the battery is excessively heated, a continuous short-circuit due to surface contact of the positive electrode plate and the negative electrode plate can be suppressed. Therefore, a highly safe nonaqueous electrolyte secondary battery can be realized.

DESCRIPTION OF THE PREFERRED EMBODIMENTS

Hereafter, the present invention will be described in detail.

Figure 1:
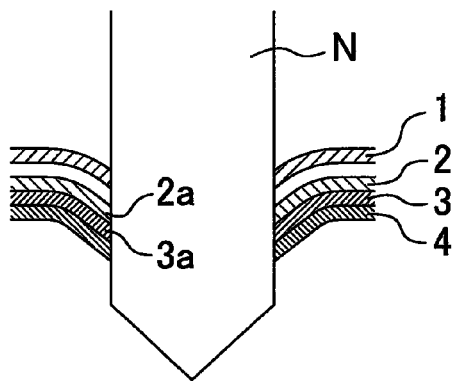
FIG. 1 is a schematic view illustrating how a nail is stuck in a known battery.
Figure 2:
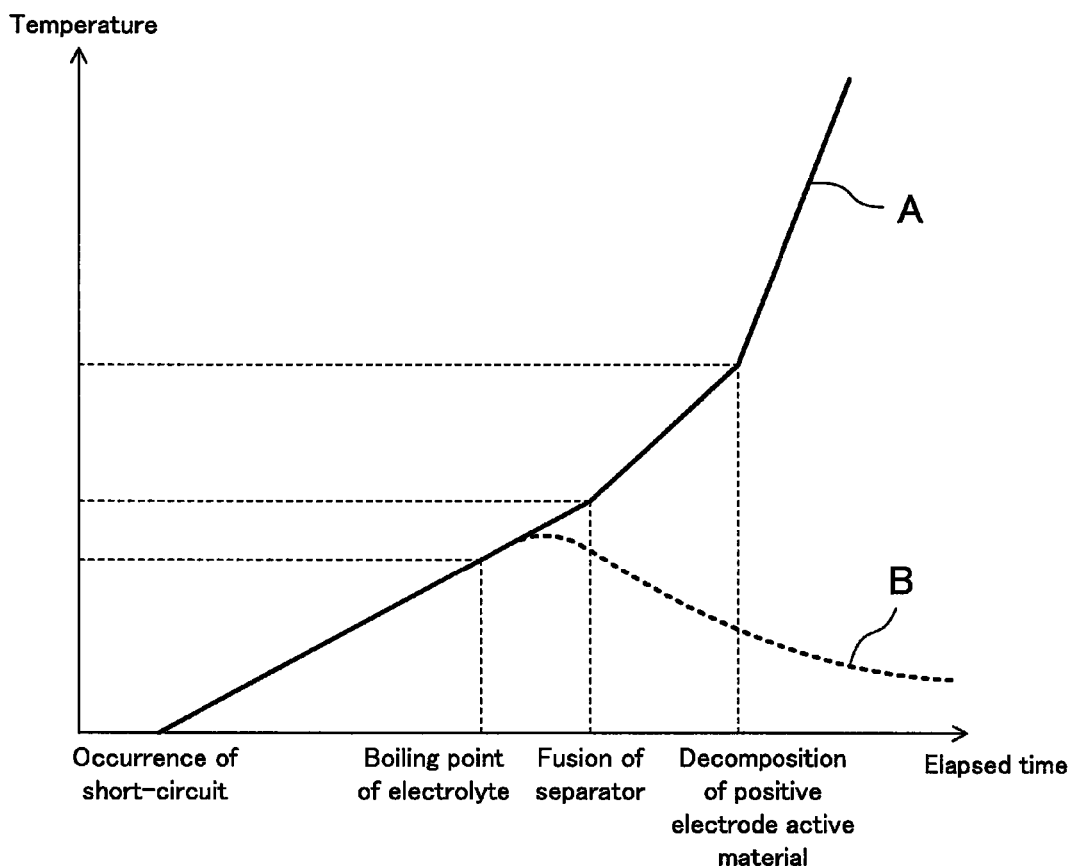
FIG. 2 is a graph showing the relationship between the elapsed time from the occurrence of a short-circuit and the temperature in the battery.

A short-circuit process caused by sticking of a nail in a known battery will be hereafter described with reference to FIG. 1 and FIG. 2. FIG. 1 is a schematic view illustrating how a nail is stuck in a known battery. FIG. 2 is a graph showing the relationship between the elapsed time from the occurrence of a short-circuit and the temperature of the battery. In FIG. 2, a curve A schematically indicates the relationship between the elapsed time and the temperature in the known battery and a curve B schematically indicates the relationship between the elapsed time and the temperature in a battery according to the present invention.

A short-circuit first occurs due to sticking of a nail in a battery. Then, a short-circuit current flows in part in which the nail is stuck and overheating is caused, whereby a temperature in the short-circuited part is drastically increased. Under the influence of the increase in temperature in the part in which the nail is stuck, a temperature in the battery is increased. In this case, the temperature in the part in which the nail is stuck is increased closely to 700° C. to 800° C. and, as shown in FIG. 1, contact parts 2a and 3a of a positive electrode plate 2 (for example, formed of an aluminum foil) and a separator 3 in contact with a nail N are fused. Due to the fusion of the contact part 2a of the positive electrode plate 2 in contact with the nail N, a short-circuit of the positive electrode plate 2 with a negative electrode plate 4 via the nail N is cut off. However, due to the fusion of the contact part 3a of the separator 3 in contact with the nail N, in a region where contact parts are pressed in the direction of sticking of the nail N, the positive electrode plate 2 is locally brought into surface contact with the negative electrode plate 4. Accordingly, the short-circuit between the positive electrode plate 2 and the negative electrode plate 4 is continuously maintained.

Because a short-circuit current continues to flow, when the temperature in the battery is increased to reach the boiling point of the electrolyte, gas generated from the electrolyte starts filling in the battery.

Furthermore, when the temperature in the battery reaches a fusing temperature of the separator, the separator is fused and the positive electrode plate and the negative electrode plate are brought into full surface contact with each other. Thus, the short-circuited part expands from the part in which the nail is stuck to entire surfaces of the electrode plates and the temperature in the battery is drastically increased.

Then, when the temperature in the battery reaches to a decomposition temperature of a positive electrode active material, the positive electrode active material is decomposed to generate oxygen, thus resulting in excessive heat of the battery.

When an internal short-circuit occurs in the battery, in order to prevent the excessive heat of the battery, it is necessary to increase a space between the positive electrode plate and the negative electrode plate and release the surface contact of the positive electrode plate and the negative electrode plate before the temperature in the battery reaches a decomposition temperature of the positive electrode active material (which is preferably the fusing temperature of the separator).

Figure 3:
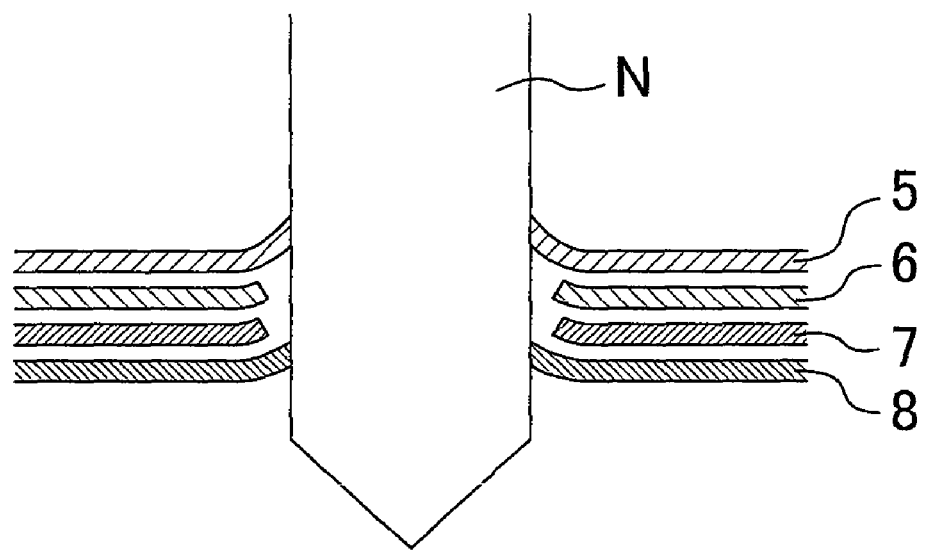
FIG. 3 is a schematic view illustrating how a nail is stuck in a battery according to the present invention.

As a result of keen examinations which the inventors of the present application conducted, the inventors focused on the gas generated from the electrolyte, a temperature at which the gas is generated from the electrolyte (which is, in general, lower than a fusing temperature of a separator) and the relationship between the strength of the exterior packaging body of the battery and the temperature in the battery (in which, in general, the strength of the battery exterior packaging body is reduced as the temperature is increased) and reached the following finding. That is, utilizing the gas pressure of the gas generated from the electrolyte, the battery exterior packaging body of which the strength has been reduced according to increase in temperature in the battery is deformed in the direction of application of the gas. Thus, as shown in FIG. 3, a space is provided between an inner surface of the battery exterior packaging body 5 and an outer surface of an electrode plate group. Accordingly, the positive electrode plate 6, the separator 7 and the negative electrode plate 8 are pressed and expanded in the direction of application of the gas by the gas pressure of the gas generated from the electrolyte, so that the inter-electrode-plate-space between the positive electrode plate 6 and the negative electrode plate 8 can be increased.

For the battery of the present invention to function as a battery, a battery exterior packaging body has a strength at which the electrode plate group can be protected in a normal operation. However, to achieve the object of the present invention, it is preferable that the battery exterior packaging body exhibits a strength at which the battery exterior packaging body is deformed by the gas pressure of the gas generated from the electrolyte when the battery is in an unusual operation. Furthermore, to utilize the finding of the present invention, the temperature range in which the battery exterior packaging body exhibits the strength at which the battery exterior packaging body can be deformed is preferably from a higher temperature than a boiling point of the electrolyte to a lower temperature than a decomposition temperature of the positive electrode active material within the temperature range in an unusual operation.

In contrast, as for the known battery, the battery exterior packaging body is firmly formed for the purpose of protecting the electrode plate group in both of a normal operation and an unusual operation. Thus, the battery exterior packaging body can not be deformed by the gas pressure of gas generated from the electrolyte, so that a short-circuit resulting from surface contact of the positive electrode plate and the negative electrode plate continuously exists and the battery might be led to an excessive heat.

Note that a temperature at which gas is generated from the electrolyte containing dimethyl carbonate, for example, used in a typical lithium ion battery or the like is 100° C. in an atmosphere pressure, the fusing temperature of a separator containing polyethylene or the like is 130° C., and the decomposition temperature of a positive electrode active material such as lithium-cobalt composite oxide or the like is 250° C.

In contrast, a short-circuit process due to sticking of a nail into the battery of the present invention will be hereafter described.

A short-circuit first occurs due to sticking of a nail in the battery. Then, a short-circuit current flows in part in which the nail is stuck and overheating is caused, whereby a temperature in the short-circuited part is drastically increased. Under the influence of the increase in temperature in the part in which the nail is stuck, a temperature in the battery is increased. In this case, the temperature in the part in which the nail is stuck is increased closely to 700° C. to 800° C. and contact parts of the positive electrode plate (for example, formed of an aluminum foil) and the separator in contact with the nail are fused. Due to the fusion of the contact part of the positive electrode plate in contact with the nail, a short-circuit of the positive electrode plate with the negative electrode plate via the nail is cut off. However, as in the known example, due to the fusion of the contact part of the separator in contact with the nail, in a region where contact parts are pressed in the direction of sticking of the nail, the positive electrode plate is locally brought into surface contact with the negative electrode plate. Accordingly, the short-circuit between the positive electrode plate and the negative electrode plate is continuously maintained.

Because a short-circuit current continues to flow, when the temperature in the battery is increased to reach a boiling point of the electrolyte, the gas generated from the electrolyte starts filling in the battery.

In this case, when the inside of the battery is filled with the gas generated from the electrolyte, the gas pressure of the gas generated from the electrolyte is applied to the inner surface of the battery exterior packaging body. Due to the gas pressure of the gas generated from the electrolyte, the battery exterior packaging body expands in the direction of application of the gas, so that a space is formed between the inner surface of the battery exterior packaging body and the outer surface of the electrode plate group. Thus, the positive electrode plate, the negative electrode plate and the separator which have been pressed in the direction of sticking of the nail, are pressed against in the direction of application of the gas by the gas pressure of the gas generated from the electrolyte filled in the battery exterior packaging body, so that an electrode plate space between the positive electrode plate and the negative electrode plate can be increased. Thus, before the temperature in the battery reaches the decomposition temperature of the positive electrode active material, i.e., the battery is excessively heated, the continuously existing short-circuit due to surface contact of the positive electrode plate and the negative electrode plate can be cut off.

As has been described, as for the battery of the present invention, even through an internal short-circuit occurs in the battery, short-circuited part does not go beyond the part in which the nail is stuck and thus does not expand in the entire electrode plates. Therefore, the safety level of the battery can be improved.

In this case, to ensure the prevention of a short-circuit due to full surface contact of the positive electrode plate and the negative electrode plate, the inter-electrode-plate-space is preferably increased by deformation of the battery exterior packaging body using the gas pressure in the battery before the temperature in the battery reaches the fusion temperature of the separator. To prevent unexpected overheating of the battery, the inter-electrode-plate-space may be increased by deformation of the battery exterior packaging body using the gas pressure in the battery before the temperature in the battery reaches the decomposition temperature of the positive electrode active material.

Hereafter, a structure of a battery exterior packaging body in a nonaqueous electrolyte secondary battery according to the present invention will be hereafter described in detail.

The battery exterior packaging body has to be designed to be deformable by the gas pressure of gas (which is mainly gas generated from the electrolyte) filled in the battery exterior packaging body before a gas releasing valve starts its operation in a temperature range from a higher temperature than the boiling point (for example, 100° C.) of the electrolyte and a lower temperature than the decomposition temperature (for example, 250° C.) of the positive electrode active material or, preferably, a lower temperature than the fusing temperature of the separator (for example, 130° C.). That is, the battery exterior packing body has to be designed to be deformable by the gas pressure in the battery exterior packaging body before the battery is excessively heated (i.e., the temperature in the battery is reaches the decomposition temperature of the positive electrode active material).

Herein, in general, the gas releasing valve releases, when an internal short-circuit occurs in the battery, gas filling in the battery exterior packaging body to the outside before the battery is excessively heated. Thus, the working pressure P of the gas releasing valve is set to be the gas pressure in the battery exterior packaging body before the battery is excessively heated.

Therefore, the battery exterior packaging body is designed to be deformable when the gas pressure of the battery exterior packaging body is smaller than the working pressure P of the gas releasing valve (i.e., the gas pressure of the battery exterior packaging body before the battery starts emitting fume), whereby the battery exterior packaging body can be reliably deformed before the battery starts emitting fume.

Figure 4:
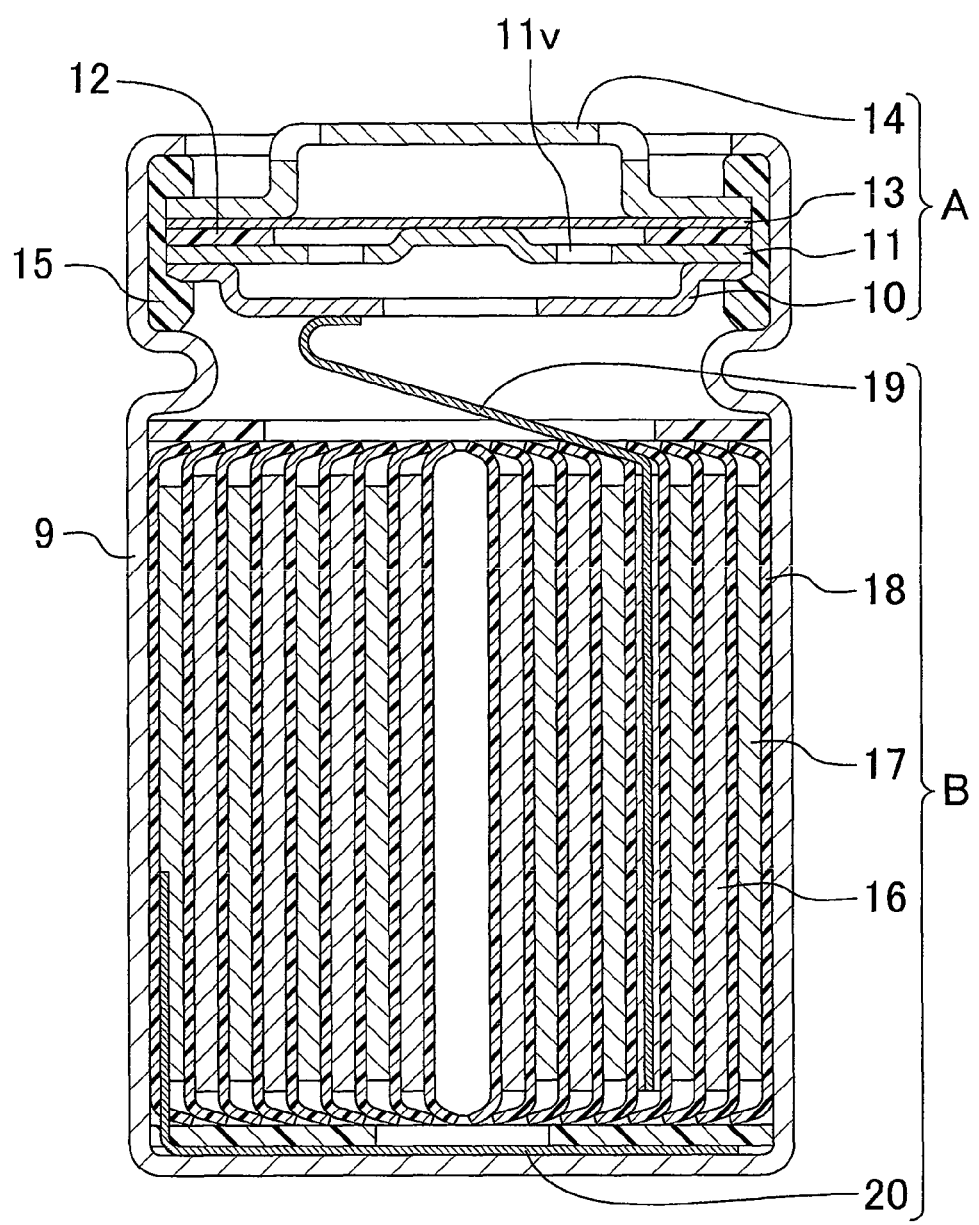
FIG. 4 is a cross-sectional view illustrating a structure of a battery according to the present invention.

Hereafter, the battery of the present invention will be hereafter described in detail with reference to FIG. 4. FIG. 4 is a cross-sectional view illustrating a structure of a battery according to the present invention.

—Battery Exterior Packaging Body—

As a battery exterior packaging body 9, for example, iron, nickel, stainless, aluminum or the like can be used.

Figure 5A:
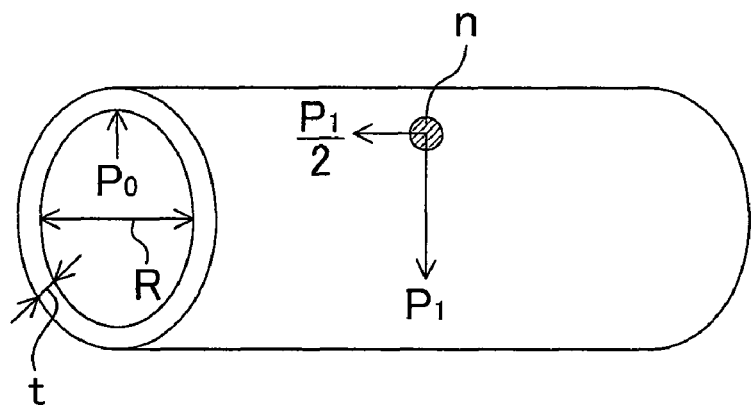
FIG. 5A is a schematic view illustrating how a stress $P_1$ is applied to a cylindrical shape battery and FIG. 5B is a schematic cross-sectional view illustrating how the stress $P_1$ is applied to the cylindrical shape battery.
Figure 5B:
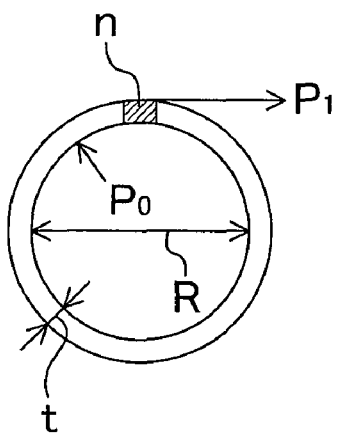

For example, in the case of a battery having a cylindrical shape, as shown in FIGS. 5A and 5B, a stress $P_1$ applied in a circumferential direction of a nail hole region n at a decomposition temperature (of, for example, 250° C.) of the positive electrode active material can be expressed by the following Equation 1 where the pressure in the battery is $P_0$ (MPa), an inner diameter of the battery exterior packaging body is R (mm) and a thickness of the battery exterior packaging body is t (mm). Note that when the pressure in the battery is denoted by $P_0$ and a stress applied to the nail hole region n in the circumference direction is denoted by $P_1$, a stress in a longitudinal direction is expressed by $P_1/2$. The stress in a circumference direction $P_1$ is larger than the stress $P_1/2$ in the longitudinal direction. Therefore, in the following description, only the stress $P_1$ in the circumference direction will be taken into consideration.

$$P_1 = P_0 R/t \qquad [\text{Equation 1}]$$

Assume that the working pressure of the gas releasing valve is P (MPa). When the pressure $P_0$ in the battery is the working pressure P of the gas releasing valve, i.e., $P_0 = P$ holds, the stress $P_1$ applied to the nail hole region n is expressed by $P_1 = PR/t$, based on Equation 1. Therefore, the battery exterior packaging body constituting the cylindrical shape battery is designed so that a tensile strength at 250° C. is smaller than PR/t. Thus, the battery exterior packaging body 9 can be deformed in the direction of application of gas by the gas pressure in the battery exterior packaging body 9 before the temperature in the battery reaches the decomposition temperature of the positive electrode active material (i.e., before the battery is excessively heated).

—Sealing Plate A—

Hereafter, a method for forming a sealing plate A will be hereafter described briefly.

As shown in FIG. 4, a metal filter 10, for example, made of aluminum, and a metal thin valve 11 housed inside the metal filter 10 and made of, for example, aluminum are connected to each other by welding. A resin inner gasket 12 is arranged above the metal thin valve 11. As shown in FIG. 4, the metal thin valve 11 includes a gas releasing valve 11v.

Then, a metal explosion protection valve body 13 made of, for example, aluminum and a metal cap 14 are connected by welding. The metal cap 14 and the metal explosion protection valve body 13 are arranged above the resin inner gasket 12. A peripheral portion of the metal filter 10 in which the above-described members are housed is sealed by caulking. In this case, it is preferable to use, for example, laser welding, resistance welding, ultrasonic welding or the like for the metal member connection formation portion.

As the resin inner gasket 12, for example, bridging polypropylene (PP) resin, polybutylene terephthalate (PBT) resin, polyphenylene sulfide (PPS) resin, perfluoroalkoxyalkane (PFA) resin, polytetrafluoroethylene (PTFE) resin or the like is used.

As the metal cap 14, for example, iron, nickel, copper, aluminum, a cladding material of any one of these materials or the like is used.

—Positive Electrode Plate—

Hereafter, a method for forming a positive electrode plate will be hereafter described briefly.

As a positive electrode active material, a material into/from which lithium electrochemically can be inserted/removed can be used. Specifically, for example, composite oxide such as lithium cobaltate, lithium nickel oxide, lithium manganate or the like, or a denatured material of any one of these composite oxides. Such a denatured material may contain aluminum, magnesium or like element. Moreover, a denatured material may also contain cobalt, nickel, manganese or like element.

As a conductive material, for example, a material such as graphite, carbon black, metal powder or the like, which is stable at a positive potential, is used.

As a binder, for example, a material, such as polyvinylidene fluoride (PVDF), polytetrafluoroethylene (PTFE) or the like, which is stable at a positive potential, is used.

As a current collector, for example, aluminum foil, aluminum perforatorium or the like is used.

A positive electrode active material is mixed with a conductive material and a binder and then is applied to a current collector. A positive electrode active material free portion is provided at an end portion of the current collector and a positive lead current collector 19 is attached by welding. Thus, a positive electrode plate 16 including the positive lead current collector 19 attached is formed.

—Negative Electrode Plate—

Hereafter, a method for forming a negative electrode plate will be hereafter described briefly.

As a negative electrode active material, a material into/from which lithium electrochemically can be inserted/removed can be used. Specifically, for example, natural graphite, artificial graphite, aluminum, silicon, various alloys containing these materials, respectively, as a main component, metal oxide such as silicon oxide, tin oxide or the like, or metal nitride can be used.

As a conductive material, for example, a material, such as graphite, carbon black, metal powder or the like, which is stable at a negative potential, is used.

As a binder, for example, a material, such as styrene-butadiene copolymer rubber (SBR), carboxymethyl cellulose (CMC) or the like, which is stable at a negative potential, is used.

As a current collector, for example, copper foil, copper perforatorium or the like is used.

A negative electrode active material is mixed with a conductive material and a binder and then is applied to a current collector. A negative electrode active material free portion is provided at an end portion of the current collector and a negative lead current collector 20 is attached by welding. Thus, a negative electrode plate 17 including the negative lead current collector 20 attached is formed.

—Electrode Plate Group B—

The positive and negative electrode plates 16 and 17 are spirally wound with a separator 18 interposed therebetween such that the positive lead current collector 19 and the negative lead current collector 20 are pulled out in different directions, respectively. Thus, an electrode plate group B is formed.

As the separator 18, for example, a microporous film or nonwoven fabric, for example, made of polyolefin or the like is used.

—Battery—

The electrode plate group B is inserted in the battery exterior packaging body 9 and the negative lead current collector 20 and a bottom of the battery exterior packaging body 9 are welded together so as to be electrically connected with each other. Then, a nonaqueous electrolyte is filled into the battery exterior packaging body 9 through an open end thereof.

As an electrolyte, for example, a nonaqueous electrolyte or a gel electrolyte formed of a polymer material containing a nonaqueous electrolyte can be used. A nonaqueous electrolyte includes a nonaqueous solvent and a solute.

As a solute, for example, lithium salt such as lithium hexafluorophosphate (LiPF6), lithium tetrafluoroborate (LiBF4) or the like can be used. The amount of dissolution of a solute with respect to a nonaqueous solvent is preferably within a range of 0.5 to 2 mol/L.

Specifically, to effectively achieve the effects of the present invention, the amount of dissolution of a solute with respect to a nonaqueous solvent is more preferably within a range of 1.2 to 2.0 mol/L. Thus, the amount of gas generated from the electrolyte when the temperature in the battery is increased due to a short-circuit can be increased.

As a nonaqueous solvent, a known nonaqueous solvent can be used. Types of the nonaqueous solvent are not particularly limited. For example, cyclic carbonate ester, chain carboxylate ester, cyclic carboxylate ester or the like is used. Specifically, as cyclic carbonate ester, propylene carbonate (PC), ethylene carbonate (EC) or the like can be used. As chain carboxylate ester, diethyl carbonate (DEC), ethyl methyl carbonate (EMC), dimethyl carbonate (DMC) or the like can be used. As cyclic carboxylate ester, γ-butyrolactone (GBL), γ-valerolactone (GVL) or the like can be used. As a nonaqueous solvent, one of the above-described materials may be independently used or combination of two or more of the above-described materials may be used.

Specifically, to effectively achieve the effects of the present invention, as a main solvent of the nonaqueous solvent, DMC having a low boiling point is preferably used. Thus, the amount of gas generated from the electrolyte when the temperature in the battery is increased due to a short-circuit can be increased.

As an additive to be contained in the electrolyte, for example, vinylene carbonate, cyclohexyl benzene, diphenyl ether or the like can be used.

After the above-described steps, the positive lead current collector 19 pulled out from the open end of the battery exterior packaging body 9 and the sealing plate A are welded together so that the sealing plate A is attached onto the battery exterior packaging body 9. Then, an entire circumference portion of the opening end of the battery exterior packaging body 9 is sealed with a resin outer gasket 15 interposed between the sealing plate A and the battery exterior packaging body 9 by caulking. Thus, a battery according to the present invention is formed.

In the above description, the case where in order to effectively achieve the effects of the present invention, the dissolution amount of a solute with respect to a nonaqueous solvent is increased or a solvent having a low boiling point is used as a nonaqueous solvent to increase the amount of gas generated from the electrolyte to be filled in the battery exterior packaging body when the temperature in the battery is increased due to a short-circuit has been described as a specific example. However, the present invention is not limited to this case.

For example, in order to more effectively achieve the effects of the present invention, the electrode plate group preferably contains the gas generating material to increase the amount of gas to be filled in the battery exterior packaging body when the temperature in the battery is increased due to a short-circuit. In this case, as a gas generating material to be contained in the electrode plate group, a material which does not harmfully affect the original function of the battery and generates gas at a lower temperature than the decomposition temperature of the positive electrode active material is preferably selected. For example, it is preferable to select at least one of inorganic carbonate such as sodium hydrogen carbonate, potassium hydrogen carbonate, lithium carbonate, zinc carbonate, lead carbonate, strontium carbonate or the like, organic acid such as malonic acid, adipic acid, acetoacetic acid, oxalic acid, lithium oxalate or the like, and the like.

To achieve the object of the present invention, the gas pressure of gas generated from the gas generating material is preferably applied to the electrode plate group. Therefore, it is preferable that at least one of the positive electrode plate, the negative electrode plate, the separator and the electrolyte which constitute the electrode plate group contains the gas generating material.

In the above description, as a specific example of a battery of the present invention, a lithium ion battery having a cylindrical shape has been described. However, the present invention is not limited to the cylindrical shape lithium ion battery. For example, in the case of a nickel hydrogen storage battery, a nickel cadmium storage battery or the like, the effects of the present invention can be utilized in the same manner as described above using a generally used material.

The separator in the above description means a component having the function of providing insulation between the positive electrode plate and the negative electrode plate and retaining the electrolyte.

In the above-description, "gas generated from electrolyte" includes both of gas obtained through vaporization of a solute in a nonaqueous solvent and gas obtained by vaporization of a nonaqueous solvent. That is, "the boiling point of the electrolyte" means lower one of a temperature at which a solute in a nonaqueous solvent is evaporated and gas is generated and a temperature at which the nonaqueous solvent is evaporated and gas is generated.

In the above-description, for example, gas generated from the gas generating material includes gas generated through vaporization of the gas generating material when it reaches its boiling point, gas generated through thermal decomposition of the gas generating material when it reaches its thermal decomposition temperature and the like.

Hereafter, working examples will be described.

Working Example 1

Hereafter, a structure of a battery according to Working Example 1 will be described in detail with reference to FIG. 4. Note that in the following description, as a sealed secondary battery, a lithium ion battery having a cylindrical shape will be described as an example.

The battery of Working Example 1 includes an electrode plate group B which has a cylindrical shape and in which a positive electrode plate 16 made of a positive electrode current collector of aluminum foil with a positive electrode mixture applied thereto and a negative electrode plate 17 made of a negative electrode current collector of copper foil with a negative electrode mixture applied thereto are spirally wound with a separator 18 having a thickness of 25 μm interposed between the positive and negative electrode plates 16 and 17.

As shown in FIG. 4, a positive lead current collector 19 is laser welded with the aluminum foil current collector. On the other hand, a negative lead current collector 20 is resistance welded with the copper foil current collector.

The electrode plate group B is housed in a battery exterior packaging body (metal case with a bottom) 9. The negative lead current collector 20 and a bottom of the metal case 9 are resistance welded together to be electrically connected with each other. On the other hand, the positive lead current collector 19 is laser welded with a metal filter 10 of a sealing plate A through an open end of the metal case 9 so that the positive lead current collector 19 and the metal filter 10 are electrically connected with each other.

In the metal case 9, a nonaqueous electrolyte is filled through the open end thereof. A trench is formed on the open end side of the metal case 9 to form a stub portion. The positive lead current collector 19 is folded, a resin outer gasket 15 and the sealing plate A are attached to the stub portion of the metal case 9, and an entire circumference of the open end of the metal case 9 is sealed by caulking.

(1) Forming of Positive Electrode Plate

A positive electrode plate was formed in the following manner. Lithium cobaltate powder having decomposition temperature (oxygen gas generation stating temperature) of 250° C. in 85 weight parts as a positive electrode active material, carbon power in 10 weight parts as a conductive material, and an N-methyl-2-pyrolidone (which will be hereafter referred to as "NMP") solution containing polyvinylidene fluoride (which will be hereafter referred to as "PVDF") in 5 weight parts as a binder were mixed. After a resultant mixture was applied to an aluminum foil current collector having a thickness of 15 μm and dried, then was rolled, thereby forming a positive electrode plate having a thickness of 100 μm.

(2) Forming of Negative Electrode Plate

A negative electrode plate was formed in the following manner. Artificial graphite in 95 weight parts as a negative electrode active material and a NMP solution containing PVDF in 5 weight parts as a binder were mixed. A resultant mixture was applied to a copper foil current collector having a thickness of 10 μm and dried, and then was rolled, thereby forming a negative electrode plate having a thickness of 110 μm.

(3) Preparation of Nonaqueous Electrolyte

A nonaqueous electrolyte was prepared in the following manner. A nonaqueous solvent containing a mixture of ethylene carbonate, ethyl methyl carbonate and dimethyl carbonate (which will be referred to as DMC and whose boiling point is 97° C.) at a volume ratio of 1:1:8 was used as a nonaqueous solvent and lithium hexafluorophosphate ($LiPF_6$) was used as a solute. The solute was dissolved in the nonaqueous solvent such that the concentration of the solute was 1.5 mol/L. Thus, a nonaqueous electrolyte was prepared.

(4) Forming of Sealed Secondary Battery

A positive electrode plate and a negative electrode plate were wound with a separator having a thickness of 25 μm interposed therebetween to form an electrode plate group having a cylindrical shape with an inner diameter of 25.0 φ. Thereafter, the electrode plate group was sealed in a 3003 aluminum alloy case with a bottom having an inner diameter of 25.5 mmφ and a thickness of 0.25 mm together with the nonaqueous electrolyte of 15 ml. Thus, a sealed nonaqueous electrolyte secondary battery having a design capacity of 2700 mAh was obtained. The battery obtained in the above-described manner was referred to as the battery A.

Working Example 2

Instead of dimethyl carbonate in Working Example 1, triethyl phosphate (which will be referred to as TEP and whose boiling point is 220° C.) was used as a nonaqueous solvent. Except that a mixture of ethylene carbonate, ethyl methyl carbonate and triethyl phosphate at a volume ratio of 1:1:8 was used as a nonaqueous solvent, a battery was formed in the same manner as the battery A. The obtained battery was referred to as a battery B.

Working Example 3

Except that a 1100 aluminum case with a bottom having an inner diameter of 25.5 mmφ and a thickness of 0.25 mm was used as a case with a bottom, a battery was formed in the same manner as the battery A. The obtained battery was referred to as a battery C.

Working Example 4

Except that sodium hydrogen carbonate was contained in a positive electrode plate, a battery was formed in the same manner as the battery A. The obtained battery was referred to as a battery D. An example where sodium hydrogen carbonate was contained in the positive electrode plate will be hereafter described briefly.

For example, in the process described in (1) Forming of positive electrode plate, in addition to the positive electrode active material, the conductive material and the binder, sodium hydrogen carbonate in 1 weight parts was used. Those materials were all mixed. After a resultant mixture was applied to an aluminum foil current collector having a thickness of 15 μm and was dried, the mixture was rolled, thereby forming a positive electrode plate having a thickness of 100 μm.

Working Example 5

Except that sodium hydrogen carbonate was contained between a positive electrode mixture and a current collector, a battery was formed in the same manner as the battery A. The obtained battery was referred to as a battery E. An example where sodium hydrogen carbonate was contained between the positive electrode mixture and the current collector will be hereafter described briefly.

For example, polyvinylidene fluoride in 4 weight parts (with respect to sodium hydrogen carbonate in 100 weight parts) as a binder was dissolved in N-methyl-2-pyrolidone and then sodium hydrogen carbonate as a gas generating material and acetylene black in 2 weight parts (with respect to sodium hydrogen carbonate in 100 weight parts) as a conductive material were mixed therein, thereby preparing a slurry. The slurry was applied to both sides of an aluminum foil (current collector) having a thickness of 15 μm and dried. Thus, a conductive thin film containing the gas generating material and having a thickness of 5 μm was formed. After a mixture of a positive electrode active material, a conductive material and a binder were applied onto the conductive thin film and dried, the conductive thin film was rolled, thereby forming a positive plate having a thickness of 100 μm. Thus, sodium hydrogen carbonate was contained between the current collector and the positive electrode mixture.

Working Example 6

Except that sodium hydrogen carbonate was contained in a surface of a positive electrode plate, a battery was formed in the same manner as the battery A. The obtained battery was referred to as a battery F. An example where sodium hydrogen carbonate was contained in the surface of the positive electrode plate will be hereafter described briefly.

For example, polyvinylidene fluoride in 4 weight parts (with respect to sodium hydrogen carbonate in 100 weight parts) as a binder was dissolved in N-methyl-2-pyrolidone and then sodium hydrogen carbonate as a gas generating material was mixed therein, thereby preparing a slurry. The slurry was applied to both sides of a positive electrode plate formed in the same manner as in Working Example 1 and dried. Thus, a thin film containing the gas generating material and having a thickness of 5 nm was formed. In the above-described manner, sodium hydrogen carbonate was contained in the surface of the positive electrode plate.

Working Example 7

Except that sodium hydrogen carbonate was contained in a nonaqueous electrolyte, a battery was formed in the same manner as the battery A. The obtained battery was referred to as a battery G.

Working Example 8

Except that potassium hydrogen carbonate was contained in a surface of a positive electrode plate, a battery was formed in the same manner as the battery A. The obtained battery was referred to as a battery H. For example, by forming a battery in the same manner as in Working Example 6 using, instead of sodium hydrogen carbonate in Working Example 6, potassium hydrogen carbonate, potassium hydrogen carbonate was contained in the surface of the positive electrode plate.

Working Example 9

Except that lithium carbonate was contained in a surface of a positive electrode plate, a battery was formed in the same manner as the battery A. The obtained battery was referred to as a battery I. For example, by forming a battery in the same manner as in Working Example 6 using, instead of sodium hydrogen carbonate in Working Example 6, lithium carbonate, lithium carbonated was contained in the surface of the positive electrode plate.

Working Example 10

Except that zinc carbonate was contained in a surface of a positive electrode plate, a battery was formed in the same manner as the battery A. The obtained battery was referred to as a battery J. For example, by forming a battery in the same manner as in Working Example 6 using, instead of sodium hydrogen carbonate in Working Example 6, zinc carbonate, zinc carbonate was contained in the surface of the positive electrode plate.

Working Example 11

Except that lead carbonate was contained in a surface of a positive electrode plate, a battery was formed in the same manner as the battery A. The obtained battery was referred to as a battery K. For example, by forming a battery in the same manner as in Working Example 6 using, instead of sodium hydrogen carbonate in Working Example 6, lead carbonate, lead carbonate was contained in the surface of the positive electrode plate.

Working Example 12

Except that strontium carbonate was contained in a surface of a positive electrode plate, a battery was formed in the same manner as the battery A. The obtained battery was referred to as a battery L. For example, by forming a battery in the same manner as in Working Example 6 using, instead of sodium hydrogen carbonate in Working Example 6, strontium carbonate, strontium carbonate was contained in the surface of the positive electrode plate.

Working Example 13

Except that malonic acid was contained in a surface of a positive electrode plate, a battery was formed in the same manner as the battery A. The obtained battery was referred to as a battery M. For example, by forming a battery in the same manner as in Working Example 6 using, instead of sodium hydrogen carbonate, malonic acid, malonic acid was contained in the surface of the positive electrode plate.

Working Example 14

Except that adipic acid was contained in a surface of a positive electrode plate, a battery was formed in the same manner as the battery A. The obtained battery was referred to as a battery N. For example, by forming a battery in the same manner as in Working Example 6 using, instead of sodium hydrogen carbonate in Working Example 6, adipic acid, adipic acid was contained in the surface of the positive electrode plate.

Working Example 15

Except that acetoacetic acid was contained in a surface of a positive electrode plate, a battery was formed in the same manner as the battery A. The obtained battery was referred to as a battery O. For example, by forming a battery in the same manner as in Working Example 6 using, instead of sodium hydrogen carbonate, acetoacetic acid, acetoacetic acid was contained in the surface of the positive electrode plate.

Working Example 16

Except that oxalic acid was contained in a surface of a positive electrode plate, a battery was formed in the same manner as the battery A. The obtained battery was referred to as a battery P. For example, by forming a battery in the same manner as in Working Example 6 using, instead of sodium hydrogen carbonate in Working Example 6, oxalic acid, oxalic acid was contained in the surface of the positive electrode plate.

Working Example 17

Except that lithium oxalate was contained in a surface of a positive electrode plate, a battery was formed in the same manner as the battery A. The obtained battery was referred to as a battery Q. For example, by forming a battery in the same manner as in Working Example 6 using, instead of sodium hydrogen carbonate in Working Example 6, lithium oxalate, lithium oxalate was contained in the surface of the positive electrode plate.

Comparative Example 1

Except that a case with a bottom formed of a cold rolled steel plate (SPCD) and having an inner diameter of 25.5 mm$\phi$ and a thickness of 0.25 mm was used as a case with a bottom, a battery was formed in the same manner as the battery A. The obtained battery was referred to as the battery R.

<Nail Sticking Test>

A nail sticking test based on the SBA standard was conducted for the batteries A through Q formed in the above-described working examples and the battery R formed in Comparative Example 1. Conditions where the nail sticking test was conducted will be hereafter described in detail.

Each of the batteries A through R was charged by a constant current of 2.5 A until the voltage of each battery reached 4.2 V and then was charged at constant voltage until the current of each battery reached 250 mA. A nail of $\phi 4.8$ was stuck in a center portion of circumference surface of each battery to pass through in the diameter direction in the environment where a nail sticking speed was 5 mm/sec and a temperature was 60° C. Then, the temperature of each battery was measured.

The highest temperatures of respective battery surfaces of the batteries A through R in the nail sticking test are shown in Table 1.

TABLE 1

| Battery A | Battery B | Battery C | Battery D | Battery E | Battery F |
|---|---|---|---|---|---|
| 121° C. | 130° C. | 108° C. | 110° C. | 105° C. | 105° C. |
| Battery G | Battery H | Battery I | Battery J | Battery K | Battery L |
| 107° C. | 109° C. | 108° C. | 116° C. | 118° C. | 115° C. |
| Battery M | Battery N | Battery O | Battery P | Battery Q | Battery R |
| 105° C. | 106° C. | 110° C. | 105° C. | 110° C. | 330° C |

As shown in Table 1, the highest temperatures of the batteries A through Q are lower than that of the battery R.

Hereafter, results of the nail sticking test for the batteries A through R will be described in detail.

In the battery A, a 3003 aluminum alloy case with a bottom having a thickness of 0.25 mm was used. Thus, even when an internal short-circuit occurred in the battery, due to the gas pressure of gas generated from an electrolyte to be filled in the case, the case was deformed in the direction of application of the gas before a gas releasing valve would start its operation (i.e., the battery would be excessively heated). Accordingly, a space was provided between an inner surface of the case and an outer surface of an electrode plate group.

Thus, due to the gas pressure in the case, the positive and negative electrode plates pressed in the direction of sticking of the nail were pressed back in the opposite direction to the direction of sticking of the nail (in other words, in the direction of application of gas), so that an inter-electrode-plate-space between the positive electrode plate and the negative electrode plate was increased. Therefore, a continuous short-circuit due to a surface contact of the positive electrode plate and the negative electrode plate was suppressed and the highest temperature of the battery A was 121° C., which was lower than the highest temperature of the battery R, i.e., 330° C.

In the battery B, triethyl phosphate having a high boiling point solvent was used as a nonaqueous solvent forming the electrolyte. Thus, even when an internal short-circuit occurred in the battery, due to the gas pressure of gas generated from the electrolyte, the case was deformed in the direction of application of the gas before the battery would be excessively heated. However, since the amount of gas generated from the electrolyte was small, compared to the battery A, a continuous short-circuit due to surface contact of the positive electrode plate and the negative electrode plate was suppressed after a longer elapsed time from a time point of sticking of the nail. Therefore, the highest temperature of the battery B was 130° C., which was higher than the highest temperature of the battery A, i.e., 121° C. (however, the highest temperature of the battery B was sufficiently lower than the highest temperature of the battery R, i.e., 330° C.).

In the battery C, a 1100 aluminum case with a bottom having a thickness of 0.25 nm was used. The case of the battery C was more easily deformed, compared to the case of the battery A, and thus, even when an inner short-circuit occurred in the battery, the case was deformed by a smaller gas pressure in the case. Accordingly, a continuous short-circuit due to surface contact of the positive electrode plate and the negative electrode plate was suppressed after a shorter elapsed time from a time point of sticking of the nail, compared to the battery A, and the highest temperature of the battery C was 108° C., which was lower than the highest temperature of the battery A, i.e., 121° C.

In the batteries D through G, as a gas generating material, sodium hydrogen carbonate was contained in the positive electrode plate forming the electrode plate group, between the positive electrode mixture and the current collector, in the positive electrode plate surface, or the nonaqueous electrolyte. Thus, even when an internal short-circuit occurred in the battery, the case with a bottom was deformed in the direction of application of gas, before the battery would be excessively heated, by not only the gas pressure of gas generated from the electrolyte as in the battery A but also by the gas pressure of gas generated from sodium hydrogen carbonate. Accordingly, a continuous short-circuit due to surface contact of the positive electrode plate and the negative electrode plate was suppressed after a shorter elapsed time from a time point of sticking of the nail, compared to the battery A, and the highest temperatures of the batteries D through G were 110° C., 105° C., 105° C. and 107° C., respectively, which were all lower than the highest temperature of the battery A, i.e., 121° C. Since a gas generating material exhibits its effects regardless of its location, a gas generating material may be contained in any member constituting the electrode plate group.

In the batteries H through Q, as a gas generating material, potassium hydrogen carbonate, lithium carbonate, zinc carbonate, lead carbonate, strontium carbonate, malonic acid, adipic acid, acetoacetic acid, oxalic acid or lithium oxalate was contained in the positive electrode plate surface constituting the electrode plate group. Thus, even when an internal short-circuit occurred in the battery, the case with a bottom was deformed in the direction of application of gas, before the battery would be excessively heated, by not only the gas pressure of gas generated from the electrolyte as in the battery A but also by the gas pressure of gas generated from a gas generating material. Accordingly, a continuous short-circuit due to surface contact of the positive electrode plate and the negative electrode plate was suppressed after a shorter elapsed time from a time point of sticking of the nail, compared to the battery A, and the highest temperatures of the batteries H through Q were 109° C., 108° C., 116° C., 118° C., 115° C., 105° C., 106° C., 110° C., 105° C. and 110° C., respectively, which were all lower than the highest temperature of the battery A, i.e., 121° C.

In contrast, in the battery R, as a case with a bottom, a cold rolled steel plate (SPCD) with a bottom, having a thickness of 0.25 mm (in other words, a case with a bottom, which was formed so that the case was not deformable by the gas pressure of gas in the case before the gas releasing valve started its operation) was used. Thus, even when an internal short-circuit occurred, the case with a bottom was not deformed in the direction of application of gas by the gas pressure of gas generated from the electrolyte and did not provide a space between the inner surface of the case and the outer surface of the electrode plate group before the gas releasing valve started its operation (or the battery started emitting fume). Accordingly, the inter-electrode-plate-space between the positive electrode plate and the negative electrode plate was not increased and a continuous short-circuit due to surface contact of the positive electrode plate and the negative electrode plate was not suppressed, and the highest temperature of the battery R was 330° C., which was higher than those of the batteries of A through Q.

As has been described, according to the present invention, a nonaqueous electrolyte secondary battery which can maintain high level safety when an internal short-circuit occurs due to external impacts such as sticking of a nail therein or crush by application of pressure or when a short-circuit occurs due to mixture of a foreign substance or the like. Therefore, a nonaqueous electrolyte secondary battery according to the present invention can be preferably utilized in mobile equipment such as mobile telecommunication equipment, mobile electronic equipment and the like, and large scale equipment such as automobile use power supply or backup power supply.

What is claimed is:

1. A nonaqueous electrolyte secondary battery in which an electrode plate group including a positive electrode plate and a negative electrode plate which have a positive electrode mixture layer formed on a positive electrode current collector to contain a positive electrode active material and a negative electrode mixture layer formed on a negative electrode current collector to contain a negative electrode active material, respectively, and are spirally wound or stacked with a separator interposed therebetween is encapsulated in a battery exterior packaging body with an electrolyte, wherein the battery exterior packaging body includes a gas releasing valve for releasing gas in the battery exterior packaging body to the outside when a gas pressure in the battery exterior packaging body reaches a working pressure of the gas releasing valve, wherein the battery exterior packaging body is formed to be deformable, in a temperature range which is lower than a decomposition temperature of the positive electrode active material, when the gas pressure in the battery exterior packaging body is lower than the working pressure of the gas releasing valve, wherein the battery exterior packaging body has a cylindrical shape, and a tensile strength of the battery exterior packaging body is smaller than PR/t where the working pressure of the gas releasing valve is P, an inner diameter of the battery exterior packaging body is R and a thickness of the battery exterior packaging body is t, and wherein the battery exterior packaging body is made of iron, nickel, or stainless steel, or the battery exterior packaging body is made of aluminum or aluminum alloy.

2. The nonaqueous electrolyte secondary battery of claim 1, wherein in a temperature range which is higher than a boiling point of the electrolyte and is lower than a decomposition temperature of the positive electrode active material, the battery exterior packaging body is formed to be deformable when the gas pressure in the battery exterior packaging body is lower than the working pressure of the gas releasing valve.

3. The nonaqueous electrolyte secondary battery of claim 1, wherein the positive electrode active material contains at least one of manganese composite oxide, nickel composite oxide and cobalt composite oxide.

4. The nonaqueous electrolyte secondary battery of claim 1, wherein at least one of members constituting the electrode plate group contains a gas generating material for generating gas at a lower temperature than a decomposition temperature of the positive electrode active material.

5. The nonaqueous electrolyte secondary battery of claim 4, wherein the gas generating material generates gas at a higher temperature than a fusing temperature of the separator.

6. The nonaqueous electrolyte secondary battery of claim 4, wherein the gas generating material generates gas at a higher temperature than a boiling point of the electrolyte.

7. The nonaqueous electrolyte secondary battery of claim 4, wherein the gas generating material contains at least one of sodium hydrogen carbonate, potassium hydrogen carbonate, lithium carbonate, zinc carbonate, lead carbonate, strontium carbonate, malonic acid, adipic acid, acetoacetic acid, oxalic acid and lithium oxalate.

8. The nonaqueous electrolyte secondary battery of claim 4, wherein the at least one of members containing the gas generating material is the positive electrode mixture layer.

9. The nonaqueous electrolyte secondary battery of claim 4, further comprising:
    a conductive thin film formed between the positive electrode mixture layer and the positive electrode current collector,
    wherein the at least one of members containing the gas generating material is the conductive thin film.

10. The nonaqueous electrolyte secondary battery of claim 4, further comprising:
    a thin film formed in a surface of the positive electrode plate,
    wherein the at least one of members containing the gas generating material is the thin film.

11. The nonaqueous electrolyte secondary battery of claim 4, wherein the at least one of members containing the gas generating material is the electrolyte.

* * * * *